United States Patent Office 3,164,566
Patented Jan. 5, 1965

3,164,566
DYEABLE LINEAR POLYESTERS MODIFIED BY A METALLOSULFOPHENOXYALKOXY-SUBSTITUTED AROMATIC DICARBOXYLIC ACID OR ESTER
Christian F. Horn, South Charleston, W. Va., assignor to Union Carbide Corporation, a corporation of New York
No Drawing. Filed Nov. 1, 1961, Ser. No. 149,205
18 Claims. (Cl. 260—49)

This invention relates to new condensation polymers. The invention also relates to textile articles, i.e., fibers, filaments, yarns, etc., as well as the films and other structures of said polymers which have an improved affinity for dyestuffs.

Synthetic linear polyesters are well known to the art, and are readily prepared, for example, by the reaction of dibasic carboxylic acids, or their ester-forming derivatives, with dihydric alcohols, or their functional derivatives. The high-molecular weight linear polyesters thus obtained find frequent use in the production of textile articles, films, and the like. Of particular interest in this regard are the polyesters of terephthalic acid and its esters with glycols, such as polyethylene terephthalate and the polyester from dimethyl terephthalate and 1,4-cyclohexanedimethanol, etc. Unfortunately, the filamentous products produced from these polyesters have little affinity for dyestuffs by conventional dyeing procedures, and consequently, their utility in the fabric field is somewhat restricted.

It was to be expected that many efforts would be made to improve the dyeability of a film-, and filament-forming material having as many desirable characteristics as those possessed by polyethylene terephthalate. Such efforts have indeed been made. However, the efforts that have resulted in some degree of success in making polyethylene terephthalate more dyeable have done so only at the expense of degrading the polymer substantially with respect to its other characteristics. Thus, for example, a reported effort to improve the dyeability of polyethylene terephthalate by incorporating within its structure minor amounts of certain amino alcohols, thereby giving the polymer a greater ability to absorb acetate dyes and acid dyes, seriously reduces the heat stability of the polyethylene terephthalate so modified. Another effort in this direction involved chemical incorporation of long chain polyalkylene oxides having molecular weights of the order of 1000 to 6000. This modification of the polyethylene terephthalate, unfortunately, made it quite sensitive to air oxidation and to light. Another proposal involved the utilization of toxic carriers such as the chlorobenzenes, chlorophenols, and the like, for the dyeing process. Still another involved the application of vat or acetate dyes under superatmospheric pressure at temperatures above 100° C. Another required the use of fiber-swelling agents or dye carriers. Still another involved the use of pigments that are mixed directly with the polyethylene terephthalate melt before spinning.

It is apparent that these efforts have at best had very limited success. The methods involving chemical incorporation of modifying agents such as amino alcohols and polyalkylene oxides have involved substantial reduction in thermal stability, the use of toxic carriers is inherently undesirable and dangerous, and special dyeing techniques, such as those requiring dyestuffs that are stable at high temperatures, are too expensive to be commercially practicable.

These difficulties have now been overcome without impairing the characteristics of the polyester. Thus, for example, polyethylene terephthalate fibers and films made in accordance with the method of this invention as hereinbelow described are readily dyeable by ordinary dyeing techniques, while at the same time retaining excellent heat and light stability, dimensional stability and other desirable physical properties.

The dyeable linear polyesters of this invention are prepared essentially from an aromatic dicarboxylic acid or an ester-forming derivative thereof, with a diol, such as an acyclic or alicyclic aliphatic glycol, an aromatic diol, an aliphatic-aromatic diol, or a diester thereof, and a small amount of a metallosulfophenoxyalkoxy-substituted aromatic dicarboxylic acid or ester of the formula:

(I)  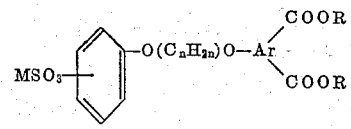

wherein M designates an alkali metal atom, as for instance, a lithium, sodium, potassium, rubidium, or cesium atom, etc., and preferably designates an alkali metal atom having an atomic number of from 3 to 19, i.e., a lithium, sodium, or potassium atom, $n$ designates an integer having a value of from 1 to about 12, and preferably from 1 to about 8; and R designates an alkyl radical containing from 1 to about 8 carbon atoms, such as a methyl, ethyl, propyl, butyl, isobutyl, pentyl, hexyl, 2-methylpentyl, 2-ethylbutyl, heptyl, octyl, or 2-ethylhexyl radical, etc., of which the lower alkyl radicals containing from 1 to about 4 carbon atoms are preferred.

As typical of the metallosulfophenoxyalkoxy-substituted aromatic monocarboxylic acids and esters which can be used to prepare dyeable linear polyesters in accordance with this invention, there can be mentioned:

4-(2-[4-((sodiumsulfo))phenoxy]ethoxy)phthalic acid
5-(2-[4-((lithiumsulfo))phenoxy]ethoxy)terephthalic acid
5-([4-((potassiumsulfo))phenoxy]methoxy)isophthalic acid
5-(2-[4-((sodiumsulfo))phenoxy]ethoxy)isophthalic acid
5-(2-[3-((lithiumsulfo))phenoxy]ethoxy)isophthalic acid
5-(3-[4-((potassiumsulfo))phenoxy]propoxy)isophthalic acid
5-(4-[4-((sodiumsulfo))phenoxy]butoxy)isophthalic acid
5-(6-[4-((lithiumsulfo))phenoxy]hexoxy)isophthalic acid
5-(8-[4-((potassiumsulfo))phenoxy)octoxy)isophthalic acid
5-(2-ethyl-6-[4-((sodiumsulfo))phenoxy]hexoxy)isophthalic acid
5-(12-[4-((lithiumsulfo))phenoxy]dodecoxy)isophthalic acid
6-(2-[4-((potassiumsulfo))phenoxy]ethoxy)1,4-naphthalene dicarboxylic acid
Dimethyl 4-(2-[4-((sodiumsulfo))phenoxy]ethoxy) phthalate
Dimethyl 5-(2-[4-((lithiumsulfo))phenoxy]ethoxy) terephthalate
Dimethyl 5-([4-((potassiumsulfo))phenoxy]mbethoxy) isophthalate
Octyl 5-(2-[4-((sodiumsulfo))phenoxy]ethoxy)isophthalate
Di(2-ethylhexyl) 5-(2-[3-((lithiumsulfo))phenoxy] ethoxy)isophthalate
Butyl 5-(3-[4-((potassiumsulfo))phenoxy]propoxy) isophthalate
Dipropyl 5-(4-[4-((sodiumsulfo))phenoxy]butoxy) isophthalate Diethyl 5-(6-[4-((lithiumsulfo))phenoxy]hexoxy)isophthalate
Dimethyl 5-(8-[4-((potassiumsulfo))phenoxy]octoxy)isophthalate
Dimethyl 5-(2-ethyl-6-[4-((sodiumsulfo))phenoxy]hexoxy)isophthalate
Dimethyl 5-(12-[4-((lithiumsulfo))phenoxy]dodecoxy)isophthalate
Dimethyl 6-(2-[4-((potassiumsulfo))phenoxy]ethoxy)1,4-naphthalene dicarboxylate, and the like.

The present invention is especially concerned with the use of the metallosulfophenoxyalkoxyphthalic acids (including the iso-, and terephthalic acids) and esters represented by the sub-generic formula:

(II) 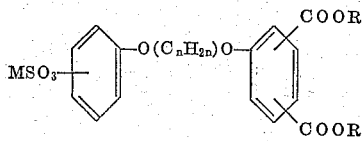

wherein $m$, $n$ and R are as defined above.

The metallosulfophenoxyalkoxy-substituted aromatic dicarboxylic acids and esters contemplated by this invention can be obtained by various methods. The phthalic acid derivatives represented above by Formula II can, for example, be obtained by steps which include the sulfonation of a member of a known class of compounds, viz., the phenoxyalkoxyphthalic acids and dialkyl carboxylate diesters thereof represented by the formula:

(III) 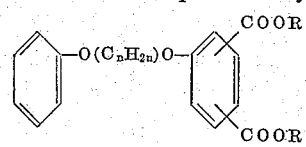

wherein $n$ and R are as defined above. As typical of such compounds, there can be mentioned:

4-(2-phenoxyethoxy)phthalic acid
5-(2-phenoxyethoxy)terephthalic acid
5-(phenoxymethoxy)isophthalic acid
5-(2-phenoxyethoxy)isophthalic acid
5-(3-phenoxypropoxy)isophthalic acid
5-(4-phenoxybutoxy)isophthalic acid
5-(6-phenoxyhexoxy)isophthalic acid
5-(8-phenoxyoctoxy)isophthalic acid
5-(2-ethyl-6-phenoxyhexoxy)isophthalic acid
5-(12-phenoxydodecoxy)isophthalic acid
Dimethyl 4-(2-phenoxyethoxy)phthalate
Dimethyl 5-(2-phenoxyethoxy)terephthalate
Dimethyl 5-(phenoxymethoxy)isophthalate
Dioctyl 5-(2-phenoxyethoxy)isophthalate
Di(2-ethylhexyl) 5-(2-phenoxyethoxy)isophthalate
Dibutyl 5-(3-phenoxypropoxy)isophthalate
Dipropyl 5-(4-phenoxybutoxy)isophthalate
Diethyl 5-(6-phenoxyhexoxy)isophthalate
Dimethyl 5-(8-phenoxyoctoxy)isophthalate
Dimethyl 5-(2-ethyl-6-phenoxyhexoxy)isophthalate
Dimethyl 5-(12-phenoxydodecoxy)isophthalate, and the like.

Moreover, while reference is hereinafter made, for illustrative purposes, to the production of phthalic acid derivatives, i.e., the compounds represented above by Formula I wherein Ar designates a phenyl radical, the disclosure is also applicable to the corresponding naphthalene dicarboxylic acid derivatives. Thus, for instance, compounds represented by the formula:

(IV) 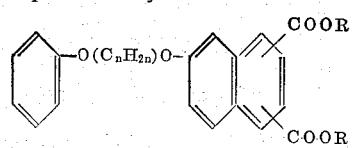

wherein $n$ and R are as defined above, such as 7-(2-phenoxyethoxy)-1,5-naphthalene dicarboxylic acid and dimethyl 7-(2-phenoxyethoxy)-1,5-naphthalene dicarboxylate, can also be employed as starting materials or precursors.

The phenoxyalkoxyphthalic acids and esters hereinabove described can initially be obtained, for example, by the reaction of a phenoxyalkylhalide with an alkali metal di(carboxy)- or di(carboalkoxy)phenolate in accordance with the equation:

(V) 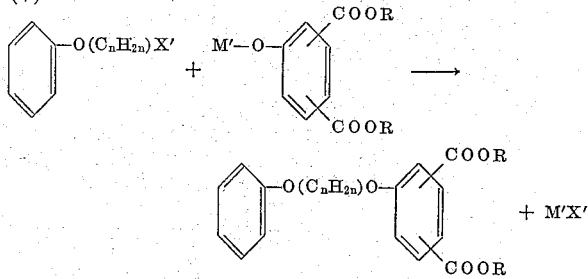

wherein M′ designates an alkali metal atom, such as a sodium atom, etc., X′ designates a halogen atom, such as a chlorine or bromine atom, etc., and $n$ and R are as defined above. Such a reaction can be carried out by bringing the halide and the phenolate into reactive admixture in a suitable solvent, such as ethanol, N,N-dimethylformamide, dioxane, etc., and at a temperature of from about 20° C. to about 100° C., or higher. The phenoxyalkoxyphthalic acid or ester product can thereafter be recovered in any convenient manner, such as by crystallization and filtration, by isolation as a residue product upon evaporation or distillation of any solvent present, etc.

The conversion of the phenoxyalkoxyphthalic acid or ester represented above by Formula III to the corresponding sulfophenoxyalkoxyphthalic acid or ester represented by the formula (VI) 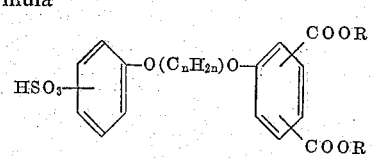

wherein $n$ and R are as defined above, can be carried out by known sulfonation procedures. Thus, for example, the phenoxyalkoxyphthalic acid or ester can be sulfonated by reaction with a mild sulfonating agent comprised of a mixture of sulfuric acid and acetic anhydride, at a temperature of from about −15° C. to about 50° C., and preferably from about 0° C. to about 25° C. The phenoxyalkoxyphthalic acid or ester, of which the latter is preferably employed, is best introduced to the sulfonating agent in solution, using, by way of illustration, an inert solvent such as methylene dichloride, ethylene dichloride, ethyl acetate, or the like. The mole ratio of sulfuric acid to acetic anhydride in the sulfonating agent can vary from about 0.1 to about 1 mole of sulfuric acid per mole of acetic anhydride, with a ratio of from about 0.2 to about 0.6 mole of sulfuric acid per mole of acetic anhydride being preferred. The mole ratio of sulfuric acid to the phenoxyalkoxyphthalic acid or ester can vary from about 0.5 to about 5 moles of sulfuric acid per mole of the phenoxyalkoxyphthalic acid or ester, with a ratio of from about 0.8 to about 1.5 moles of sulfuric acid per mole of the phenoxyalkoxyphthalic acid or ester being preferred.

Produced as hereinabove described, the sulfonated phenoxyalkoxyphthalic acid or ester product can be recovered, if desired, in any convenient manner, such as that described above in connection with the recovery of the unsulfonated product. Moreover, while the para-substituted derivative in which the sulfo radical is located at the 4-position of the phenyl ring is most readily produced, other sulfonated derivatives, i.e., the ortho- or meta-substituted derivatives, are also often formed, or can be obtained by varying the sulfonation reaction in a manner determinable by those skilled in the art in light of this disclosure.

When the starting material employed is the free phthalic acid, i.e., when R of Formula IV is hydrogen, the sulfonated product can readily be converted to the corresponding dialkyl dicarboxylate by esterification in conventional manner with an alkyl alcohol containing from 1 to about 8 and preferably from 1 to about 4 carbon atoms. The presence of the sulfo radical during the esterification serves to catalyze the reaction (autocatalysis), thus obviating the incorporation of an additional esterification catalyst.

The sulfonated phenoxyalkoxyphthalic acid or ester can thereafter be reacted with an alkali metal hydroxide or alkoxide, or an alkali metal salt of an acid weaker than sulfonic acid, such as acetic acid or benzoic acid, etc., to form the corresponding alkali metal sulfonate salt, i.e., metallosulfo derivative. Preferably, such a reaction is carried out in an alcoholic or aqueous solution, and at a temperature of from about 5° C. to about 110° C., and preferably from about 20° C. to about 50° C.

The mole ratio of alkali metal hydroxide, alkoxide or salt to the sulfophenoxyalkoxyphthalic acid or ester can vary from about 1 to about 10 moles of the alkali metal-containing compound per mole of the sulfophenoxyalkoxyphthalic acid or ester, with a ratio of from about 1 to about 2.5 moles of the alkali metal hydroxide, alkoxide, or salt per mole of the sulfophenoxyalkoxyphthalic acid or ester being preferred. Moreover, when the sulfonated product undergoing reaction is the phthalate diester, the conversion of the product to the alkali metal sulfonate derivative can be effected conveniently by titration with alkali metal hydroxide or alkoxide preferably in alcoholic solution, to a pH of 7 to 8.

The alkali metal sulfonate salt thus produced can subsequently be recovered in any convenient manner, such as that described above in connection with the recovery of the unsulfonated phenoxyalkoxyphthalic acid or ester, and thereafter be employed to prepare dyeable linear polyesters in accordance with this invention, as hereinbelow described. For convenience, the metallosulfophenoxyalkoxy-substituted aromatic dicarboxylic acids and esters thus produced will hereinafter be referred to as the difunctional dye-assistants of this invention.

Particularly suitable diols for use in preparing the dyeable linear polyesters of this invention are the acyclic and alicyclic aliphatic glycols containing from 2 to 10 carbon atoms, especially those represented by the general formula $HO(CH_2)_mOH$ wherein $m$ is an integer of from 2 to 10, such as ethylene glycol, trimethylene glycol, pentamethylene glycol, hexamethylene glycol, decamethylene glycol, and the like. Other suitable aliphatic glycols include 1,4-cyclohexanedimethanol, 3-ethyl-1,5-pentanediol, p-xylylene glycol, 2,2,4,4-tetramethyl-1,3-cyclobutanediol, and the like. It is known that any glycol of an aliphatic nature, whether or not it contains aromatic nuclei, can be used in the production of linear polyesters. Thus, the term aliphatic glycol as employed herein includes all those glycols of acyclic and alicyclic aliphatic nature which are known to the art to be suitable. Still other suitable diols include aliphatic-aromatic diols such as 5-hydroxybenzyl alcohol, aromatic diols such as hydroquinone, etc. Mixtures of two or more diols are also contemplated with up to about 10 mole percent or slightly more of any one diol being replaced by a different diol.

Particularly suitable aromatic dicarboxylic acid compounds for use in producing the dyeable linear polyesters of this invention are the monocyclic aromatic dicarboxylic acids and the dialkyl esters thereof preferably containing from 1 to about 8 carbon atoms in each alkyl ester radical, especially terephthalic acid and the dialkyl esters thereof, such as dimethyl terephthalate and similar esters in which the alkyl ester radicals more preferably contain from 1 to about 4 carbon atoms. Other suitable aromatic dicarboxylic acids or esters include.

Isophthalic acid,
p,p'-Diphenylcarboxylic acid,
p,p'-Dicarboxydiphenyl ethane,
p,p'-Dicarboxydiphenyl hexane,
p,p'-Dicarboxydiphenyl sulfide,
p,-p'-Dicarboxydiphenyl sulfone,
p,p'-Dicarboxydiphenyl ether,
p,p'-Dicarboxyphenoxy ethane,
2,6-naphthalene dicarboxylic acid; their alkyl esters; and the like.

Mixtures of two or more dicarboxylic acids or esters are also contemplated, with up to about 10 mole percent or slightly more of any one aromatic dicarboxylic acid or ester being replaced by a different aromatic dicarboxylic acid or ester, or by an aliphatic dicarboxylic acid or ester, such as adipic acid, succinic acid, sebacic acid, dimethyl sebacate, dimethyl 1,2-eicosane dioate, dimethyl bicyclo-[2.2.2]-oct-5-ene dicarboxylate, dimethyl azelate, dimethyl 3,6-dimethyl octanedioate, and the like.

Dyeable linear polyesters can also be prepared by the self-condensation of a hydroxycarboxylic acid or hydroxycarboxylic acid ester together with a difunctional dye-assistant of this invention, or by the partial replacement of a diol or aromatic dicarboxylic acid or ester with a hydroxycarboxylic acid or ester within the limits hereinabove described.

The amount of difunctional dye-assistant employed in preparing the dyeable linear polyesters of this invention can be varied from about 0.1 to about 10 mole percent of the dye-assistant based upon the total amount of other dicarboxylic acid compounds charged, i.e., as the free acid or as the ester. A preferred ratio is from about 0.15 to about 4 mole percent of the dye-assistant, based upon the total amount of other dicarboxylic acid compounds charged.

A monofunctional molecular weight regulator such as those described in British Patent 838,663 can also be employed in an amount varying generally from about 0.1 to about 3.5 mole percent of molecular weight regulator based upon the total amount of dicarboxylic acid compounds charged. A preferred ratio is from about 0.15 to about 2.5 mole percent of the molecular weight regulator based upon the total amount of dicarboxylic acid compounds charged.

Moreover, the molecular weight regulator can, by appropriate selection, also serve as a dye-assistant, thereby further enhancing the dyeability of the linear polyesters of this invention. As illustrative of the molecular weight regulators which can also serve as a dye-assistant, there can be mentioned the metallosulfophenoxyalkanoic acids and esters represented by the formula:

(VII) 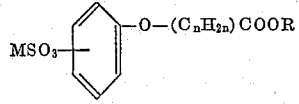

wherein M, $n$ and R are as defined above in connection with formula I. As typical thereof, there can be mentioned:

(2-[sodiumsulfo]phenoxy)acetic acid
3-(4-[potassiumsulfo]phenoxy)propionic acid
6-(4-[sodiumsulfo]phenoxy)hexanoic acid
8-(2-[lithiumsulfo]phenoxy)octanoic acid
Octyl (2-[sodiumsulfo]phenoxy)acetate
Butyl 3-(4-[potassiumsulfo]phenoxy)propionate
Methyl 6-(4-[sodiumsulfo]phenoxy)hexanoate
Methyl 8-(2[lithiumsulfo]phenoxy)hexanoate, and the like.

Such compounds can be produced by reactions similar to those described above in connection with the production of the difunctional dye-assistants of this invention, employing as the starting material a phenoxyalkanoic acid or ester of the formula:

(VIII)

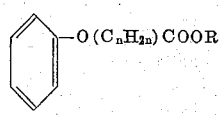

wherein $n$ and $R$ are as defined above. Other monofunctional compounds which can serve as a dye-assistant and/or molecular weight regulator will also occur to those skilled in the art, and can be employed in accordance with this invention.

In preparing the dyeable linear polyesters of this invention, at least about a 1.3 to 1 molar ratio of diol to dicarboxylic acid or ester is used. However, an excess of diol to dicarboxylic acid compound ranging from about 2 to 10 moles of diol per mole of dicarboxylic acid compound can also be used. A more satisfactory ratio is from about 1.3 to about 7 moles of diol per mole of dicarboxylic acid compound with a ratio of from about 1.5 to about 5 moles of diol per mole of dicarboxylic acid compound being especially preferred.

In the practice of this invention, the prescribed amounts of diol, dicarboxylic acid or ester including the difunctional dye-assistant, and catalyst and/or monofunctional molecular weight regulator or dye-assistant when desired, are charged to a reactor. When a dicarboxylic acid ester is employed as a reactant, the reaction mixture is heated at a temperature of from about 150° C. to about 270° C., and preferably from about 170° C. to about 260° C., in an inert atmosphere to effect an initial ester interchange reaction. Alternatively, an initial direct esterification can be carried out by employing the free dicarboxylic acid instead of the ester as a reactant. Thereafter, any excess glycol is removed by heating the reaction mixture to a temperature of about 300° C., under reduced pressure in an inert atmosphere, or by passing a stream of an inert gas through the reaction mixture at atmospheric pressure. A polycondensation is then carried out by heating the reaction mixture at a temperature of from about 225° C. to about 325° C., and preferably from about 250° C. to about 290° C., under a reduced pressure of from about 0.1 mm. to about 20 mm. of mercury, and preferably from about 0.1 mm. to about 5 mm. of mercury, in an inert atmosphere. If desired, the entire reaction can be carried out at atmospheric pressure while bubbling a stream of inert gas through the reaction mixture, the rate of gas flow being increased as the polycondensation proceeds. The total reaction period can be from about one to twelve hours, according to the catalyst employed and its concentration, the temperature, the pressure, the starting monomers, the viscosity desired for the polyester product, etc., as is known to the art.

The monomers are preferably reacted in contact with a suitable catalyst in order to shorten the reaction period and thus lessen the possibility of discoloration. Any of the well known polyesterification catalysts can be used, such as antimony oxide, zinc acetate, manganese acetate, cobaltous acetate, zinc succinate, zinc borate, magnesium methoxide, sodium methoxide, barium oxide, cadmium formate, litharge, dibutyltin oxide, tetraisopropyl titanate, calcium titanium silicate, and the like. Other conventional catalysts can also be employed. The concentration of the catalyst can be varied from about 0.001 to about 1 percent by weight, based upon the total amount of dicarboxylc acid compound charged. A preferred amount is from about 0.005 to about 0.5 percent by weight of catalyst, and more preferably from about 0.01 to about 0.2 percent by weight of catalyst, based upon the total amount of dicarboxylic acid compound charged. Other materials can also be included in the reaction mixture, as for example, color inhibitors such as alkyl or aryl phosphites; pigments, delusterants or other additives, such as titanium dioxide or barium carbonate; or viscosity stabilizers, etc.

A typical procedure for preparing the polyesters is described, for example, in U.S. 2,465,319, although this procedure can be varied by one skilled in the art in light of this disclosure.

That the difunctional dye-assistants of this invention could be employed in the preparation of high-melting, crystalline, linear polyesters was surprising and unexpected since phenoxyalkoxybenzoic acids and esters, the basic structure of the dye-assistants, ordinarily discolors and/or decomposes when heated to the temperature employed in making the polyesters. Thus, it was unexpected that the dye-assistants would be sufficiently stable, both chemically and thermally, to withstand the polycondensation conditions in the presence of the other reactants, as well as the high temperatures necessary for spinning the polyesters. It was also surprising that the fibers produced from these polyesters showed no disadvantages in physical properties over the unmodified polyester fibers, and that they exhibited greatly enhanced dyeability, as well as many other desirable textile properties. By way of illustration, such fibers are also often desirably delustered or "whitened," and upon dyeing with basic or disperse dyestuffs by standard procedures possess medium to deep shades of color having good wash fastness and light fastness, as well as stability to conventional dry cleaning operations. Fabrics produced from the fibers are also characterized by a desirable "hand," and "wash-and-wear" properties. The improved dyeability of the polyesters is believed due in no small part to the flexibility or rotatability of the metallosulfophenyl radicals of the dye-assistants of this invention about the adjacent oxygen atom, thereby making the dye-attractive metallosulfo radicals more accessible to dye during dyeing operations.

The following specific examples serve as further illustration of the present invention. In the examples, the reduced viscosity, ($I_R$), of the dyeable linear polyesters of this invention was determined by dividing the specific viscosity of a solution of the polyester by the concentration of the polyester in the solution. The specific viscosity was determined by dividing the difference between the viscosity of the polyester solution and the viscosity of the solvent by the viscosity of the solvent. In particular, the reduced viscosity of the polyesters was calculated from the equation $$I_R = \frac{\Delta N}{N_0} \times \frac{1}{C}$$

wherein $\Delta N$ is the difference between the flow time of the polyester solution and the flow time of the solvent, $N_0$ is the flow time of the solvent, and $C$ is the concentration of the polymer in grams per 100 milliliters of solution. The reduced viscosities were obtained at a polymer concentration of 0.2 gram per 100 milliliters of solution, using a 3:2 mixture of phenol and tetrachloroethane as the solvent. The reduced viscosity of the polyesters can vary from about 0.2 to about 3, with values from about 0.35 to about 1 being preferred.

The dyeable linear polyesters of this invention are melt-spun to form filaments and yarns. Before melt-spinning, the polyesters were dried overnight at a temperature of 90° C. under a reduced pressure of 2 mm. mercury, and then generally melt-extruded in a plunger-type spinning machine at a temperature of from 270° C. to 295° C. using a spinnerette having 30 holes, each 0.015 inch in diameter. The orifice velocity was 3 feet per minute and the yarn was taken up at 150 feet per minute, a draw ratio of 50:1. The yarn was hot-stretched at a temperature of 90° C. around an electrically heated pin to an extent of from 200 to 500 percent, and then continuously annealed at a temperature of 150° C. over an electrically heated bar, allowing 10 percent relaxation. In certain instances, viz., in connection with the dyeable linear polyesters of this invention prepared as described below in Examples V, VI, and VII, yarn was melt-spun from the polyesters at a temperature of 285° C., using a screw-extruder spinning machine with an orifice velocity of 16.6 feet per minute. The yarn was taken up at 3,500 feet per minute and hot-stretched to an extent of from 100 to 400 percent over a heated pin and platen combination at temperatures of 80° C. and 150° C., respectively, and then annealed at a temperature of 150° C., allowing 6 percent relaxation. The yarns were thereafter woven into fabrics and dyed. The spinning procedures used are conventional for polyesters, and are well known to the art.

The fabrics were dyed by standard procedures both in the absence of, and using dye-carriers. The dye baths used had a liquor-to-fiber bath ratio of 40:1 and, based upon the weight of the fabric to be dyed, generally contained 1 percent by weight of nonyl phenyl polyethylene glycol ether in the case of a basic dyebath, and 1 percent by weight of sodium N-methyl-N-oleoyltaurate in the case of a disperse dyebath. The dye concentration was 3 percent by weight based upon the weight of the fabric.

In a typical dyeing procedure, the various components of the dyebath were admixed and made up to volume with distilled water. The dyestuff was introduced as a paste in 0.25 percent by weight of acetic acid, based upon the weight of the fabric to be dyed. The fabric was scoured in a commercially available washer and dried in a commercially available drier. About 5 to 10 grams of the fabric was added to the dyebath, and the tempreature of the bath was raised to the boil over a period of 15 minutes, and held at the boil for an additional period of 90 minutes. The dyed fabric was then rinsed in warm water and scoured in an aqueous solution containing 1 percent by weight of a commercially available alkyl phenyl polyethylene glycol ether surfactant and 0.25 percent by weight of soda ash, based upon the weight of the fabric, at a temperature of 60° C. for a period of 15 minutes. The dyed and scoured fabric was finally rinsed in water and air dried.

Among the basic and disperse dyestuffs which readily dye the fibers produced from the polyesters of this invention, one can mention the "Genacryl" dyes discussed on pages 432 to 433 of the American Dyestuff Reporter, volume 43, 1954, for example, Genacryl Red 6B (Basic Violet 7, Color Index No. 48020); Genacryl Pink G (Basic Blue 1, Color Index No. 42025) Celliton Fast Red GGA Ex. Conc. (Disperse Red 17, Color Index No. 11210); Fuchsine SPC (Basic Red 9, Color Index No. 42500); Fuchsine Conc. (Basic Violet 14, Color Index No. 42510); Methyl Violet 2B (Basic Violet 1, Color Index No. 42535); Methylene Blue SP (Basic Blue 9, Color Index No. 52015); Victoria Green (Basic Green 4, Color Index No. 4200); Rhodamine B (Basic Violet 10, Color Index No. 45170); Sevron Yellow R (Basic Yellow 11, Color Index No. 48055); Celliton Fast Pink BA (Disperse Red 15, Color Index No. 60710); Latyl Blue FL; Maxilon Red BL, Sevron Brilliant Red 4G (Basic Red 14); Sevron Blue 5G (Basic Blue, Color Index 51004); and the like.

For control purposes, fibers were melt-spun from each of the following polyesters: (a) polyethylene terephthalate; (b) the polyester condensation product of ethylene glycol with 90 mole percent of terephthalic acid and 10 mole percent of isophthalic acid; and (c) the polyester condensation product of terephthalic acid with 1,4-cyclohexanedimethanol; i.e., excluding the difunctional dye-assistant of this invention. Upon subjecting the fibers to standard dyeing procedures, as indicated above, the fibers were not dyed by Genacryl Pink G or Sevron Blue 5G, and were dyed to only a very light shade with Celliton Fast Red GGA Ex. Conc.

EXAMPLE I

A mixture of 175 grams of dimethyl terephthalate, 3.95 grams of dimethyl 5-(2-[4-((sodiumsulfo))phenoxy]ethoxy)isophthalate, 180 grams of ethylene glycol, 0.06 gram of zinc acetate, and 0.018 gram of antimony oxide was charged to a reactor and heated at a temperature of from 175° C. to 185° C. for a period of 6 hours to bring about an ester exchange, while distilling methanol formed during the reaction. The reaction mixture was then heated to a temperature of 269° C. over a period of 2.5 hours to remove the glycol excess. Thereafter, the temperature of the reaction mixture was maintained in the range of from 270° C. to 272° C. for a period of 5.75 hours to carry out a polycondensation. During the reaction, a vigorous stream of nitrogen was passed through the reaction mixture at atmospheric pressure. A white, crystalline polyester was thereby obtained, having a reduced viscosity of 0.68 and a melting point of 252–4° C. The polyester was characterized by excellent dyeable fiber-forming and cold-drawing properties. Fibers melt-spun from this polyester were dyed to a medium shade with Genacryl Pink G and to a deep shade with Celliton Fast Red GGA Ex. Conc. without the use of a carrier. Similarly dyeable fibers are also obtained from the polyester prepared as described above in this example, employing dibutyl 5-(2-[4-((potassiumsulfo))phenoxy]ethoxy)-isophthalate as the difunctional dye-assistant of this invention.

EXAMPLE II

A mixture of 175 grams of dimethyl terephthalate, 5.9 grams of dimethyl 5-(2-[4-((sodiumsulfo))phenoxy]ethoxy)isophthalate, 180 grams of ethylene glycol, 0.063 gram of zinc acetate, and 0.018 gram of antimony oxide was charged to a reactor and heated at a temperature of from 183° C. to 185° C. for a period of 7.5 hours to bring about an ester exchange, while distilling methanol formed during the reaction. The reaction mixture was then heated to a temperature of 271° C. over a period of 1.5 hours to remove the glycol excess. Thereafter, the temperature of the reaction mixture was maintained in the range of from 270° C. to 271° C. for a period of 5.5 hours to carry out a polycondensation. During the reaction, a vigorous stream of nitrogen was passed through the reaction mixture at atmospheric pressure. A white, crystalline polyester was thereby obtained, having a reduced viscosity of 0.67 and a melting point of 252–4° C. The polyester was characterized by excellent dyeable fiber-forming and cold-drawing properties. Fibers melt-spun from this polyester were dyed to a deep shade with Genacryl Pink G and to a deeper shade with Celliton Fast Red GGA Ex. Conc. without the use of a carrier. Similarly dyeable fibers are also obtained from the polyester prepared as described above in this example, employing diethyl 2-(8-[4-((sodiumsulfo))-phenoxy]octoxy)terephthalate as the difunctional dye-assistant of this invention.

EXAMPLE III

A mixture of 175 grams of dimethyl terephthalate, 7.9 grams of dimethyl 5-(2-[4-((sodiumsulfo))phenoxy]ethoxy)isophthalate, 180 grams of ethylene glycol, 0.064 gram of zinc acetate, and 0.0183 gram of antimony oxide was charged to a reactor and heated at a temperature of from 184° C. to 188° C. for a period of 6 hours to bring about an ester exchange, while distilling the methanol formed during the reaction. The reaction mixture was then heated to a temperature of 265° C. over a period of 2.75 hours to remove the glycol excess. Thereafter, the temperature of the reaction mixture was maintained in the range of from 261° C. to 270° C. for a period of 5.5 hours to carry out a polycondensation. During the reaction, a vigorous stream of nitrogen was passed through the reaction mixture at atmospheric pressure. A white, crystalline polyester was thus obtained, having a reduced viscosity of 0.55 and a melting point of 254° C. The polyester was characterized by excellent dyeable fiber-forming and cold-drawing properties. Fibers melt-spun from this polyester were dyed to very deep shades with Genacryl Pink G and with Celliton Fast Red GGA Ex. Conc. without the use of a carrier.

EXAMPLE IV

A mixture of 175 grams of dimethyl terephthalate, 9.8 grams of dimethyl 5-(2-[4-((sodiumsulfo))phenoxy]ethoxy)isophthalate, 180 grams of ethylene glycol, 0.065 gram of zinc acetate, and 0.0186 gram of antimony oxide was charged to a reactor and heated at a temperature of from 187° C. to 195° C. for a period of 5.75 hours to bring about an ester exchange, while distilling the methanol formed during the reaction. The reaction mixture was then heated to a temperature of 265° C. over a period of 3.25 hours to remove the glycol excess. Thereafter, the temperature of the reaction mixture was maintained in the range of from 265° C. to 270° C. for a period of 6 hours to carry out a polycondensation. During the reaction, a vigorous stream of nitrogen was passed through the reaction mixture at atmospheric pressure. A white, crystalline polyester was thus obtained having a reduced viscosity of 0.48 and a melting point of 247° C. The polyester was characterized by excellent dyeable fiber-forming and cold-drawing properties. Fibers melt-spun from this polyester were dyed to exceptionally deep shades with Genacryl Pink G and with Celliton Fast Red GGA Ex. Conc. without the use of a dyecarrier.

EXAMPLE V

A mixture of 2720 grams of dimethyl terephthalate, 92 grams of dimethyl 5-(2-[4-((sodiumsulfo))phenoxy]ethoxy)isophthalate, 2220 grams of ethylene glycol, 1.26 grams of zinc acetate, 0.42 gram of antimony oxide, and 2.8 grams of titanium dioxide was charged to a reactor. The reaction mixture was heated to a temperature of 202° C. for a period of 2 hours, and maintained at this temperature for an additional period of 1 hour to bring about an ester exchange, while distilling the methanol formed during the reaction. The temperature of the reaction mixture was then slowly raised to 265° C. for a period of 2 hours, accompanied by a reduction in pressure to about 3 mm. of mercury, to remove the glycol excess. Thereafter, the temperature of the reaction mixture was maintained at 266° C. for a period of 1.25 hours to carry out a polycondensation. During the reaction, a vigorous stream of nitrogen was passed through the reaction mixture. A colorless crystalline polyester was thus obtained, having a reduced viscosity of 0.61 and a melting point of 254–6° C. The polyester was characterized by excellent dyeable fiber-forming and cold-drawing properties. Fibers melt-spun from this polyester evidenced the following physical properties:

| | |
|---|---|
| Denier | 144 |
| Tenacity _____grams per denier__ | 4.2 |
| Elongation _____percent__ | 16 |
| Shrinkage in boiling water ____do____ | 2.2 |
| Dry stiffness at 25° C. ____grams per denier__ | 77 |
| Wet stiffness at 70° C. ____do____ | 34 |

The fibers were dyed to medium to deep shades with the following dyes without the use of a carrier: Celliton Fast Red GGA, Ex. Conc., Latyl Blue FL, Celliton Fast Pink BA, Sevron Blue 5G, Sevron Yellow R, and Maxilon Red BL. By way of comparison, fibers melt-spun from polyethylene terephthalate polyester, i.e., excluding the difunctional dye-assistant of this invention, were not dyed by Sevron Blue 5G, Sevron Yellow R, and Maxilon Red BL, and were dyed to only very light shades with Celliton Fast Red GGA Ex. Conc., Latyl Blue FL, and Celliton Fast Pink BA. The fibers dyed in accordance with this invention showed excellent wash-, light-, and crock-fastness, as well as stability to dry-cleaning. The fabrics knitted therefrom had a pleasantly soft and silky hand.

EXAMPLE VI

A mixture of 2525 grams of dimethyl terephthalate, 100 grams of dimethyl 5-(2-[4-((sodiumsulfo))phenoxy]ethoxy)isophthalate, 2100 grams of ethylene glycol, 1.16 grams of zinc acetate, 0.39 gram of antimony oxide and 2.5 grams of titanium dioxide was charged to a reactor and heated to a temperature of 270° C. over a period of 4 hours to bring about an ester exchange, while distilling the methanol formed during the reaction and the glycol excess. During the last hour, the pressure was slowly reduced to about 5 mm. of mercury. Thereafter, the temperature of reaction mixture was maintained at 270° C. for a period of 1.75 hours to carry out a polycondensation. During the reaction, a vigorous stream of nitrogen was passed through the reaction mixture. A white crystalline polyester was thus obtained, having a reduced viscosity of 0.65 and a melting point of 250° C. The polyester was characterized by excellent dyeable fiber-forming and cold-drawing properties. Fibers melt-spun from this polyester evidenced the following physical properties:

| | |
|---|---|
| Denier | 168 |
| Tenacity _____grams per denier__ | 4.0 |
| Elongation _____percent__ | 13 |
| Shrinkage in boiling water ____do____ | 2.4 |
| Dry stiffness at 25° C. ____grams per denier__ | 70 |
| Wet stiffness at 70° C. ____do____ | 20 |

The fibers were dyed to deep shades with each of the dyes described above in Example V without the use of a carrier. The dyed fibers evidenced excellent wash-, light-, and crock-fastness, as well as stability to dry-cleaning. The fabrics knitted therefrom had a pleasantly soft and silky hand.

EXAMPLE VII

A mixture of 2330 grams of dimethyl terephthalate, 80 grams of dimethyl 5-(2 - [4 - ((sodiumsulfo))phenoxy]ethoxy)isophthalate, 53 grams of methyl (2-[sodiumsulfo]phenoxy)acetate, 1900 grams of ethylene glycol, 1.1 grams of zinc acetate, and 0.36 gram of antimony oxide was charged to a reactor. The reaction mixture was heated to a temperature of 200° C. for a period of 1 hour, and maintained at this temperature for an additional period of 1 hour to bring about an ester exchange, while distilling the methanol formed during the reaction. The reaction mixture was then slowly heated to a temperature of 255° C. for a period of 2.75 hours, accompanied by a reduction in pressure to 3 mm. of mercury, to remove the glycol excess. Thereafter, the temperature of the reaction mixture was maintained in the range of from 262° C. to 265° C. for a period of 3 hours to carry out a polycondensation. A crystalline polyester was thus obtained, having a reduced viscosity of 0.56 and a melting point of 250–2° C. The polyester was characterized by excellent dyeable fiber-forming and cold-drawing properties. Fibers melt-spun from this polyester evidenced the following physical properties:

| | |
|---|---|
| Denier | 167 |
| Tenacity _____grams per denier__ | 2.2 |
| Elongation _____percent__ | 25 |
| Dry stiffness at 25° C. ____grams per denier__ | 93 |

The fibers were dyed to a deep shade with Sevron Blue 5G without the use of a carrier.

EXAMPLE VIII

A mixture of 30 grams of dimethyl terephthalate, 0.437 gram of methyl benzoate, 1.042 grams of dimethyl 5-(2-[4 - ((sodiumsulfo))phenoxy]ethoxy)isophthalate, 24.9 grams of ethylene glycol, 0.01416 gram of zinc acetate, and 0.00472 gram of antimony oxide was charged to a reactor and heated at a temperature of from 184° C. to 189° C. for a period of 2.5 hours to bring about an ester exchange, while distilling the methanol formed during the reaction. The reaction mixture was then heated at a temperature of from 190° C. to 233° C. for a period of 1 hour to remove the glycol excess. Thereafter, the temperature of the reaction mixture was maintained in the range of from 267° C. to 276° C. for a period of 4 hours to carry out a polycondensation. During the reaction, a vigorous stream of nitrogen was passed through the reaction mixture at atmospheric pressure. A white crystalline polyester was thus obtained having a reduced viscosity of 0.57 and a melting point of 253–4° C. The polyester was characterized by excellent dyeable fiber-forming and cold-drawing properties. Dyeable fibers melt-spun from this polyester were tough and pliable, and exhibited a cold-draw of 300 percent.

EXAMPLE IX

A mixture of 155 grams of dimethyl terephthalate, 5.98 grams of dimethyl 2-(5-[4-((potassiumsulfo))phenoxy]-pentoxy)terephthalate, 126 grams of ethylene glycol, 0.064 gram of zinc acetate, and 01016 gram of antimony oxide was charged to a reactor and heated at a temperature of from 201° C. to 211° C. for a period of 3.25 hours to bring about an ester exchange, while distilling the methanol formed during the reaction. The reaction mixture was then heated at a temperature of from 223° C. to 230° C. for a period of 1 hour to remove the glycol excess. Thereafter, the temperature of the reaction mixture was maintained in the range of from 267° C. to 275° C. for a period of 5.25 hours to carry out a polycondensation. During the reaction, a vigorous stream of nitrogen was passed through the reaction mixture at atmospheric pressure. A white crystalline polyester was thus obtained having a reduced viscosity of 0.54 and a melting point of 258–60° C. The polyester was characterized by excellent dyeable fiber-forming and cold-drawing properties. Fibers melt-spun from this polyester were tough and pliable and exhibited a cold-draw of between 450–500 percent. The fibers were dyed to a deep shade with Celliton Fast Red GGA Ex. Conc. and to a pastel shade with Sevron Blue 5G without the use of a carrier.

EXAMPLE X

A mixture of 155 grams of dimethyl terephthalate, 6.48 grams of dimethyl 2-(5-[4-((potassiumsulfo))phenoxy]-pentoxy)terephthalate, 4.02 grams of methyl 6-(4-[sodiumsulfo]phenoxy)hexanoate, 128 grams of ethylene glycol, 0.068 gram of zinc acetate, and 0.017 gram of antimony oxide was charged to a reactor and heated at a temperature of from 190° C. to 210° C. for a period of 2.5 hours to bring about an ester exchange, while distilling the methanol formed during the reaction. The reaction mixture was then heated at a temperature of from 218° C. to 225° C. for a period of 1 hour to remove the glycol excess. Thereafter, the temperature of the reaction mixture was maintained in the range of from 270° C. to 275° C. for a period of 5.33 hours to carry out a polycondensation. During the reaction, a vigorous stream of nitrogen was passed through the reaction mixture at atmospheric pressure. A white crystalline polyester was thus obtained having a reduced viscosity of 0.41 and a melting point of 256–7° C. Fibers melt-spun from this polyester were tough and pliable, and exhibited a cold-draw of between 400–450 percent. The fibers were dyed to a deep shade with Celliton Fast Red GGA Ex. Conc. and with Sevron Blue 5G without the use of a carrier.

EXAMPLE XI

A mixture of 30 grams of dimethyl terephthalate, 2.66 grams of dimethyl isophthalate, 1.177 grams of dimethyl 2 - (5 - [4 - ((lithiumsulfo))phenoxy]pentoxy)terephthalate, 64 grams of a 70 percent by weight solution of 1,4-cyclohexanedimethanol in methanol, and 2 cubic centimeters of an 11.4 percent by weight solution of

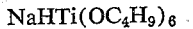

in butanol was charged to a reactor. The reaction mixture was then heated to a temperature of 240° C. over a period of 1 hour and maintained at a temperature of from 238° C. to 240° C. for an additional period of 1.67 hours to bring about an ester exchange, while distilling the methanol formed during the reaction. The reaction mixture was then heated at a temperature of from 286° C. to 305° C., under a reduced pressure of 1 mm. of mercury for a period of 2.5 hours to remove the glycol excess and carry out a polycondensation. During the reaction, a vigorous stream of nitrogen was passed through the reaction mixture. A crystalline polyester was thus obtained, having a melting point of 256–8° C. The polyester was characterized by excellent dyable fiber-forming and cold-drawing properties.

The following experiments illustrate the preparation of several of the difunctional dye-assistants of this invention. Similar procedures can be used to produce the others.

Experiment A

To 250 milliliters of ethanol, contained in a 500 milliliter, 4-necked flask equipped with a stirrer, thermometer, condenser and stopper, there were slowly added 10.8 grams of sodium methylate. The mixture was stirred until all of the sodium methylate was dissolved. Thereafter, 42 grams of dimethyl 5-hydroxyisophthalate were slowly added to the solution, which was then heated at reflux for a period of 20 minutes. Subsequently, 42 grams of phenoxyethyl bromide were slowly added to solution, and the resulting mixture was refluxed for a period of 3 hours. Upon completion of the reflux period, ethanol was distilled off to a kettle temperature of 94° C., accompanied by the formation of a sodium bromide precipitate. Heating was continued at a temperature of 94° C. for a period of 2 hours, whereupon additional ethanol was distilled off until the kettle temperature reached 130° C. The reflux condenser was removed and the mixture was heated at a temperature of 120° C. for a period of 1 hour, then allowed to stand overnight at room temperature. 250 milliliters of acetone were thereafter added to the mixture, which was then refluxed for a period of 10 minutes. Upon cooling, 20 grams of insoluble sodium bromide was filtered from the mixture. Acetone was removed from the filtrate by evaporation on a steam bath, and the residue was transferred to a distillation flask, whereupon unreacted phenoxyethyl bromide was distilled off to a kettle temperature of 185° C., under a reduced pressure of 4 millimeters of mercury. The residue was dissolved in 600 milliliters of diethyl ether, and resulting solution was washed with 200 milliliters of 5 percent aqueous sodium hydroxide, and then dried over anhydrous sodium sulfate. After the drying agent was removed by filtration, ether was removed from the filtrate by evaporation. In this manner, there were obtained about 42 grams dimethyl 5-(2-phenoxyethoxy)isophthalate as a viscous liquid.

To a 4-necked flask similar to that described above, and equipped with a dropping funnel instead of a stopper, there were charged 28.5 grams of acetic anhydride. The anhydride was cooled to 0° C., whereupon 14 grams of sulfuric acid were added dropwise thereto, accompanied by stirring and continued cooling, so that the temperature of the resulting mixture was maintained at about 0° C. To this mixture there was slowly added a solution containing 42 grams of dimethyl 5-phenoxy-ethoxyisophthalate, obtained as described above, dissolved in 200 milliliters of ethylene dichloride. After stirring the resulting solution for a period of 4 hours at a temperature maintained in the range of from 0° C. to 5° C., the solution was gradually warmed to room temperature over a 3-hour period. Thereafter, 200 milliliters of methanol were added to the solution, which was then refluxed for a period of 20 minutes to esterify the acid present, including the acetic anhydride component of the sulfonating agent. The solution was subsequently transferred to an evaporating dish, from which the solvent present was evaporated upon standing overnight. In this manner, dimethyl 5-(2-[4-sulfophenoxy]ethoxy)isophthalate was obtained as a residue product. The residue was then dissolved in 3000 milliliters of methanol, transferred to a reaction flask, and refluxed for a period of 5 hours, while distilling off methyl acetate and any trace of ethylene dichloride still present. During the distillation, methanol was added to the solution to maintain a constant volume of about 400 milliliters. Thereafter, the solution was treated with charcoal, cooled to about room temperature and titrated with methanolic sodium hydroxide to a pH of 7.2. The mixture was diluted to 1.2 liters with methanol, heated to reflux and filtered while hot to remove traces of insoluble material. Methanol was then distilled off until approximately 400 milliliters of solution remained, whereupon the solution was cooled to room temperature. A precipitate was formed and was recovered by filtration. In this manner, 32 grams of dimethyl 5-(2-[4 - ((sodiumsulfo))phenoxy]ethoxy)isophthalate were obtained as a white, crystalline product having a melting point of 335–340° C. Analysis.—Calculated for $$C_{18}H_{17}O_9SNa \cdot 05H_2O$$

C, 48.98; H, 4.11. Found: C, 49.98; H, 4.22. Infrared analysis was consistent with the identity of the product. In like manner, dibutyl 5-(2-[4-((potassiumsulfo))phenoxy]ethoxy)isophthalate is produced by the sulfonation of dibutyl 5-(2-phenoxyethoxy)isophthalate, followed by titration with potassium hydroxide.

*Experiment B*

To 500 milliliters of ethanol, contained in a 2-liter, 4-necked flask equipped with a stirrer, thermometer, condenser, and stopper, there were slowly added 20.4 grams of sodium. The mixture was stirred until all the sodium was dissolved. Thereafter 190 grams of dimethyl 2-hydroxyterephthalate were added to the solution, which was then heated to reflux. An additional 500 milliliters of ethanol was added at reflux. Subsequently, 243 grams of phenoxypentyl bromide were slowly added to the solution, and the resulting mixture was refluxed for a period of 10 hours, accompanied by the formation of sodium bromide as a precipitate. Upon completion of the reflux period, ethanol was distilled off to a kettle temperature of 140° C. Heating was continued at a temperature in the range of 135° C. to 140° C. for a period of 3 hours, whereupon the mixture was allowed to stand overnight at room temperature. To this mixture, 1 liter of diethyl ether was then added with stirring to dissolve the product, and 91 grams of insoluble sodium bromide was removed by filtration. Ether was removed from the filtrate by evaporation on a steam bath, and the residue was transferred to a distillation flask, whereupon unreacted phenoxypentyl bromide was distilled off to a kettle temperature of 180° C., under a reduced pressure of 2 milliliters of mercury. In this manner, dimethyl 2-(5-phenoxypentoxy)terephthalate was obtained in an essentially quantitative yield as a water-clear viscous liquid. Analysis.—Calculated for $C_{21}H_{24}O_6$: C, 67.72; H, 6.50. Found: C, 68.18; H, 7.07. Infrared analysist was consistent with the identity of the product.

To a 1-liter, 4-necked flask equipped with a stirrer, condenser, thermometer, and dropping funnel, there were charged 204 grams of acetic anhydride. The anhydride was cooled to a temperature of 0° C., whereupon 93 grams of sulfuric acid were added dropwise thereto, accompanied by stirring and continued cooling, so that the temperature of the resulting mixture was maintained at about 0° C. To this mixture, there were slowly added a solution containing 335 grams of dimethyl 2-phenoxypentoxyterephthalate, obtained as described above, dissolved in 300 milliliters of ethylene dichloride. After stirring the resulting solution for 4 hours at a temperature maintained in the range of from 0° C. to 5° C., the solution was gradually warmed to room temperature over a period of 1.5 hours. Thereafter, 200 milliliters of methanol were added to the solution, which was then refluxed for a period of 20 minutes. The solution was subsequently transferred to an evaporating dish, from which the solvent present was evaporated upon standing overnight. In this manner, dimethyl 2-(5-[4-sulfophenoxy]pentoxy) terephthalate was obtained as a residue product. The residue was then dissolved in 500 milliliters of methanol, transferred to a reaction flask, and refluxed for a period of 5 hours, while distilling off methyl acetate and any trace of ethylene dichloride still present. During the distillation, methanol was added to the solution to maintain a constant volume of about 850 milliliters. Thereafter, the solution was treated with charcoal and diluted to 1500 milliliters volume with methanol. An 850-milliliter portion of the solution was titrated with methanolic potassium hydroxide to a pH of 7.7. The mixture was diluted to 2.5 liters with methanol, heated to reflux, and then cooled to room temperature. A precipitate was formed and was recovered by filtration. Concentration of the filtrate yielded additional product. The solids were combined and extracted with methanol in a Soxhlet extractor. In this manner, 180 grams of dimethyl 2 - (5 - [4-((potassiumsulfo))phenoxy]pentoxy)-terephthalate were obtained as a white crystalline product. Another 100-milliliter portion of the methanolic dimethyl 2-(5-[4-sulfophenoxy]pentoxy)terephthalate solution obtained as described above was titrated with methanolic lithium hydroxide to pH 7.5. Upon evaporation of the solvent present, 31 grams of dimethyl 2-(5-[4-((lithiumsulfo))phenoxy]pentoxy)terephthalate were recovered as a solid residue product. In like manner, diethyl 2-(8-[4 - ((sodiumsulfo))phenoxy]octoxy)terephthalate is produced by the sulfonation of diethyl 2-(8-phenoxyoctoxy)terephthalate, followed by titration with sodium hydroxide.

What is claimed is:

1. A dyeable linear polyester consisting essentially of the condensation product of (*a*) a dicarboxylic acid compound selected from the group consisting of the monocyclic aromatic dicarboxylic acids and the dialkyl esters thereof; (*b*) an aliphatic glycol containing from 2 to 10 carbon atoms; and, based upon the total amount of said dicarboxylic acid compound, (*c*) from about 0.1 to about 10 mole percent of a compound of the formula:

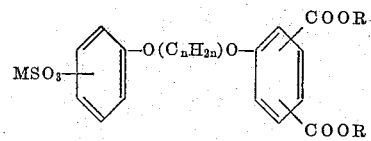

wherein M is an alkali metal; n is an integer of from 1 to 12; and R is selected from the group consisting of hydrogen and alkyl.

2. A dyeable linear polyester consisting essentially of the condensation product of (*a*) dimethyl terephthalate; (*b*) a compound of the formula:

$$HO(CH_2)_mOH$$

wherein m is an integer of from 2 to 10; and, based upon the total amount of said dimethyl terephthalate, (*c*) from about 0.1 to about 10 mole percent of a compound of the formula:

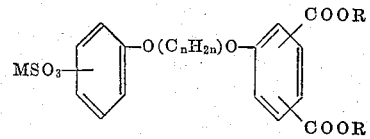

wherein M is an alkali metal; n is an integer of from 1 to 12; and R is selected from the group consisting of hydrogen and alkyl.

3. A dyeable linear polyester consisting essentially of the condensation product of (*a*) dimethyl terephthalate; (*b*) ethylene glycol; and, based upon the total amount of said dimethyl terephthalate, (*c*) from about 0.15 to about 4 mole percent of dimethyl 5-(2-[4-((sodiumsulfo))phenoxy]ethoxy)isophthalate.

4. A dyeable linear polyester consisting essentially of the condensation product of (a) dimethyl terephthalate; (b) ethylene glycol; and, based upon the total amount of said dimethyl terephthalate, (c) from about 0.15 to about 4 mole percent of dibutyl 5-(2-[4-((potassiumsulfo))phenoxy]ethoxy)isophthalate.

5. A dyeable linear polyester consisting essentially of the condensation product of (a) dimethyl terephthalate; (b) ethylene glycol; and, based upon the total amount of said dimethyl terephthalate, (c) from about 0.15 to about 4 mole percent of dimethyl 2-(5-[4-((potassiumsulfo))phenoxy]pentoxy)terephthalate.

6. A dyeable linear polyester consisting essentially of the condensation product of (a) dimethyl terephthalate; (b) ethylene glycol; and, based upon the total amount of said dimethyl terephthalate, (c) from about 0.15 to about 4 mole percent of diethyl 2-(8-[4-((sodiumsulfo))phenoxy]octoxy)terephthalate.

7. A dyeable linear polyester consisting essentially of the condensation product of (a) dimethyl terephthalate; (b) 1,4-cyclohexanedimethanol; and, based upon the total amount of said dimethyl terephthalate, (c) from about 0.1 to about 10 mole percent of a compound of the formula:

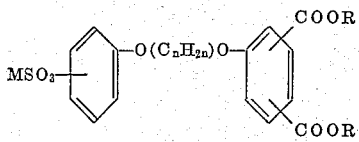

wherein M is an alkali metal; n is an integer of from 1 to 12; and R is selected from the group consisting of hydrogen and alkyl.

8. A dyeable linear polyester consisting essentially of the condensation product of (a) dimethyl terephthalate; (b) 1,4-cyclohexanedimethanol; and, based upon the total amount of said dimethyl terephthalate, (c) from about 0.15 to about 4 mole percent of dimethyl 2-(5-[4-((lithiumsulfo))phenoxy]pentoxy)terephthalate.

9. A dyeable linear polyester consisting of the condensation product of (a) a mixture of dicarboxylic acid compounds consisting of from about 90 to about 99.9 mole percent of dimethyl terephthalate and from about 0.1 to about 10 mole percent of dimethyl isophthalate; (b) ethylene glycol; and, based upon the total amount of said mixture of dicarboxylic acid compounds, (c) from about 0.1 to about 10 mole percent of a compound of the formula:

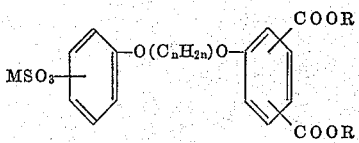

wherein M is an alkali metal; n is an integer of from 1 to 12; and R is selected from the group consisting of hydrogen and alkyl.

10. A dyeable linear polyester consisting of the condensation product of (a) dimethyl terephthalate; (b) ethylene glycol; (c) based upon the total amount of said dimethyl terephthalate, from about 0.1 to about 10 mole percent of a compound of the formula:

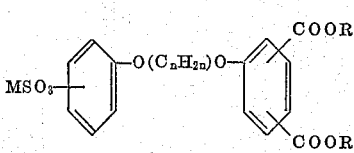

wherein M is an alkali metal; n is an integer of from 1 to 12; and R is selected from the group consisting of hydrogen and alkyl; and (d) based upon the total amount of (a) and (c), from about 0.1 to about 3.5 mole percent of a compound of the formula:

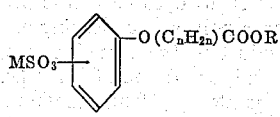

wherein M, n and R are as defined above.

11. A dyeable linear polyester consisting of the condensation product of (a) dimethyl terephthalate; (b) ethylene glycol; (c) based upon the total amount of said dimethyl terephthalate, from about 0.1 to about 10 mole percent of a compound of the formula:

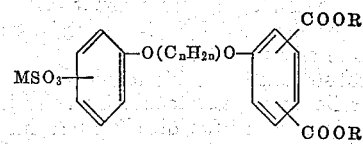

wherein M is an alkali metal; n is an integer of from 1 to 12; and R is selected from the group consisting of hydrogen and alkyl; and (d) based upon the total amount of (a) and (c), from about 0.15 to about 2.5 mole percent of methyl (4-[sodiumsulfo]phenoxy)acetate.

12. A dyeable linear polyester consisting of the condensation product of (a) dimethyl terephthalate; (b) ethylene glycol; (c) based upon the total amount of said dimethyl terephthalate, from about 0.1 to about 10 mole percent of a compound of the formula:

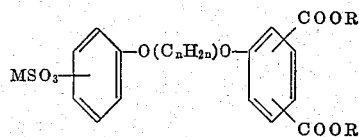

wherein M is an alkali metal; n is an integer of from 1 to 12; and R is selected from the group consisting of hydrogen and alkyl; and (d) based upon the total amount of (a) and (c), from about 0.15 to about 2.5 mole percent of methyl 6-(4-[sodiumsulfo]phenoxy)hexanoate.

13. A heat-stretched, dyeable textile article composed of a dyeable linear polyester consisting essentially of the condensation product of (a) a dicarboxylic acid compound selected from the group consisting of the monocyclic aromatic dicarboxylic acids and the dialkyl esters thereof; (b) an aliphatic glycol containing from 2 to 10 carbon atoms; and, based upon the total amount of said dicarboxylic acid compound, (c) from about 0.1 to about 10 mole percent of a compound of the formula:

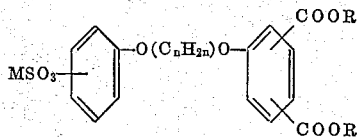

wherein M is an alkali metal; n is an integer of from 1 to 12; and R is selected from the group consisting of hydrogen and alkyl.

14. A heat-stretched, dyeable textile article composed of a dyeable linear polyester consisting essentially of the condensation product of (a) dimethyl terephthalate; (b) a compound of the formula:

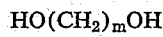

HO(CH$_2$)$_m$OH wherein m is an integer of from 2 to 10; and, based upon the total amount of said dimethyl terephthalate, (c) from about 0.1 to about 10 mole percent of a compound of the formula:

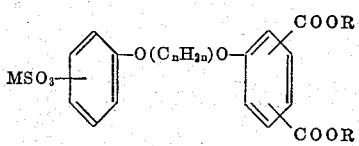

wherein M is an alkali metal; n is an integer of from 1 to

12; and R is selected from the group consisting of hydrogen and alkyl.

15. A heat-stretched, dyeable textile article composed of a dyeable linear polyester consisting essentially of the condensation product of (a) dimethyl terephthalate; (b) ethylene glycol; and, based upon the total amount of said dimethyl terephthalate, (c) from about 0.15 to about 4 mole percent of dimethyl 5-(2-[4-((sodiumsulfo))phenoxy]ethoxy)isophthalate.

16. A heat-stretched, dyeable textile article composed of a dyeable linear polyester consisting essentially of the condensation product of (a) dimethyl terephthalate; (b) ethylene glycol; and, based upon the total amount of said dimethyl terephthalate, (c) from about 0.15 to about 4 mole percent of dimethyl 2-(5-[4-((potassiumsulfo))phenoxy]pentoxy)terephthalate.

17. A heat-stretched, dyeable textile article composed of a dyeable linear polyester consisting essentially of the condensation product of (a) dimethyl terephthalate; (b) 1,4-cyclohexanedimethanol; and, based upon the total amount of said dimethyl terephthalate, (c) from about 0.1 to about 10 mole percent of a compound of the formula:

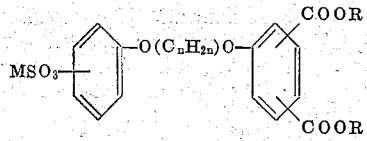

wherein M is an alkali metal; $n$ is an integer of from 1 to 12; and R is selected from the group consisting of hydrogen and alkyl.

18. A heat-stretched, dyeable textile article composed of a dyeable linear polyester consisting essentially of the condensation product of (a) dimethyl terephthalate; (b) 1,4-cyclohexanedimethanol; and, based upon the total amount of said dimethyl terephthalate, (c) from about 0.15 to about 4 mole percent of dimethyl 2-(5-[4-((lithiumsulfo))phenoxy]pentoxy)terephthalate.

References Cited in the file of this patent

UNITED STATES PATENTS

| | | |
|---|---|---|
| 2,901,466 | Kibler et al. | Aug. 25, 1959 |
| 2,970,165 | Michel et al. | Jan. 31, 1961 |
| 3,018,272 | Griffing et al. | Jan. 23, 1962 |

FOREIGN PATENTS

| | | |
|---|---|---|
| 549,179 | Belgium | Oct. 15, 1956 |